United States Patent Office 3,772,368
Patented Nov. 13, 1973

3,772,368
CHEMICAL SYNTHESIS
Henry Bader, Newton Center, and Avinash C. Mehta, Belmont, Mass., assignors to Polaroid Corporation, Cambridge, Mass.
No Drawing. Filed July 19, 1971, Ser. No. 163,998
Int. Cl. C07c 49/82
U.S. Cl. 260—590                    11 Claims

ABSTRACT OF THE DISCLOSURE

A process for preparing a silver halide developer of the following formula:

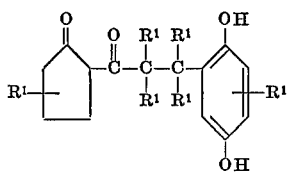

(Formula 1)

wherein $R^1$ represents a substituent which can be the same or different but which does not impair the functionality of the compound as a silver halide developer. Specific substituents include hydrogen, alkyl radicals and alkoxy radicals among others. Essentially the process involves the acylation of Schiff base anions with lactones to directly provide an intermediate which can be readily converted to the dye developer of Formula 1.

BACKGROUND OF THE INVENTION (Part 1) The field of the invention

This invention relates to photography. More precisely, the invention disclosed herein relates to a process for producing compounds which can be employed as silver halide developers but are especially useful as intermediates for providing metal complexed dyes employed in developing silver halide image patterns.

(Part 2) Description of the prior art

Metallized dyes having a silver halide developing capability are known to the art. Essentially, such dyes may be defined as compounds having a moiety of the following formula:

Y—Z          (Formula 2)

bonded to the complexing atom and wherein Y is a radical comprising a silver halide developing substituent and Z is a ligand radical, i.e., a radical of a compound containing one or more coordinating or donor atoms for forming a metal complex.

More precisely, such metallized dyes can be illustrated schematically as follows:

(Formula 3)

wherein "Dye" is a chelatable dye, "Me" is a metal complexing atom, and "Ligand Developer" is a substantially colorless ligand contributing at least one and preferably two of the coordinating or donor atoms necessary to form the desired complex and wherein the ligand contains a silver halide developing agent or substituent.

Chelatable dyes suitable as Dye in Formula 4 are known to the art and include among others, those providing the following structure with the complexing metal atom:

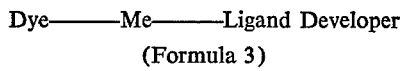

(Formula 4)

wherein A is an aromatic radical, e.g., a substituted or non-substituted phenyl or naphthyl radical; B is an aromatic or heterocyclic radical, e.g., a substituted or non-substiuted phenyl, naphthyl or pyrazolene radical and

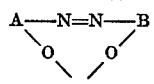

(Formula 5)

is the radical of an ortho, ortho' dihydroxy azo dye of the formula:

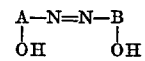

(Formula 6)

and Me is a metal complexing atom, e.g., a transition metal particularly a metal of the first transition series, i.e., chromium, copper, cobalt, nickel, iron, zinc, manganese, scandium, titanium and vanadium. Other useful metals such as aluminum, silver, palladium, and platinum will be apparent to those skilled in the art. Details relating to metallized dyes of the above described type can be found in commonly assigned U.S. Pat. 3,453,107, issued July 1, 1969 to Elbert M. Idelson.

Another class of chelatable dyes suitable as Dye in Formula 4 are those providing the following structure with the complexing metal atom:

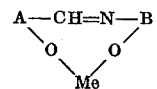

(Formula 7)

wherein A, B and Me are as defined above and

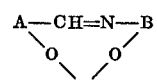

(Formula 8)

is the radical of an ortho, ortho' azomethine dye of the formula:

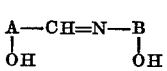

(Formula 9)

Details relating to metallized dyes containing this class of dye are described in commonly assigned applications Ser. No. 830,499, filed June 4, 1969, by Elbert M. Idelson and Ser. No. 830,480 filed June 4, 1969, by Arthur B. Goulston and Paul S. Huyffer.

Ligand developers which qualify as a "Ligand Developer" of Formula 3 are also known to the art. As mentioned, such ligand developers conform to Formula 2, e.g.,

Y—Z wherein Y is a radical comprising a silver halide developing substituent and Z is a ligand radical. Specific classes of ligand developers can be defined by the following formulae:

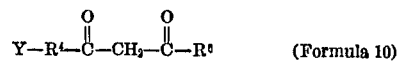

(Formula 10)

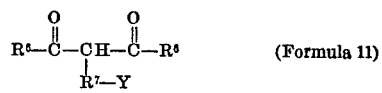

(Formula 11)

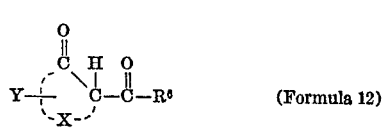

(Formula 12)

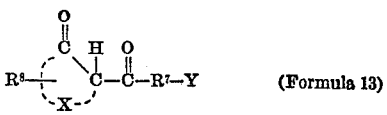

(Formula 13)

wherein: $R^4$ is an alkylene radical having from 1–6 carbon atoms or a substituent chosen from the group consisting of

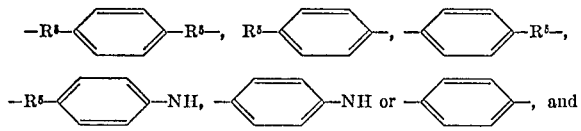

R is an alkylene radical having from 1–6 carbon atoms;
each $R^6$ is hydrogen or an alkyl radical having from 1–6 carbon atoms;
each $R^7$ is an alkylene radical having from 1–6 carbon atoms; and
$R^8$ is an alkyl radical having from 1–3 carbon atoms, an alkoxy radical having from 1–3 carbon atoms or H;
X represents the atoms necessary to complete a cyclopentane, cyclohexane or a benzene ring; and
Y is ortho or paradihydroxyphenyl or a protected derivative thereof.

Additional details relating to the above described ligand developers can be found in commonly assigned U.S. patent application Ser. No. 881,323, filed Dec. 1, 1969, by Elbert M. Idelson.

Particularly useful metallized dyes of Formula 4 are those conforming to the following formulae:

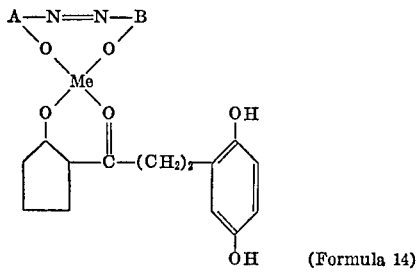

(Formula 14)

(Formula 15)

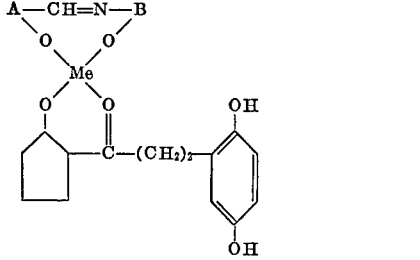

wherein it can be seen that both dyes have as their dye developing moiety, a compound of Formula 1, e.g., (Formula 16)

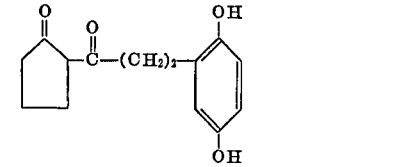

In the past, the most effective process for producing compounds of Formula 1 in the high yields desired involved close control over the saponification and acidification of a compound of the following formula:

(Formula 17)

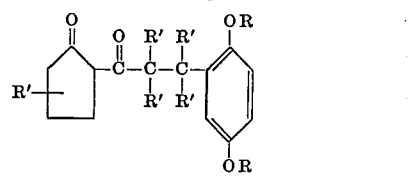

wherein R' is as defined before and R is hydrolyzable ester group. Details relating to the above described method can be found in commonly assigned application Ser. No. (Case No. 4283) filed concurrently by Henry Bader, Edwin G. E. Jahngen and Michael Feingold. In accordance with the method disclosed therein a compound of Formula 18 is prepared by way of a six-step synthesis. The present process represents an improvement over the above described method in that the present process involves the acylation of a Schiff base anion with lactones to directly provide an intermediate which can be easily converted to a compound of Formula 1.

SUMMARY OF THE INVENTION

The present invention essentially involves the acylation of specific Schiff base anions with specific lactones to directly provide an intermediate which can be hydrolyzed to form a compound of Formula 1 which, as mentioned before, is as follows:

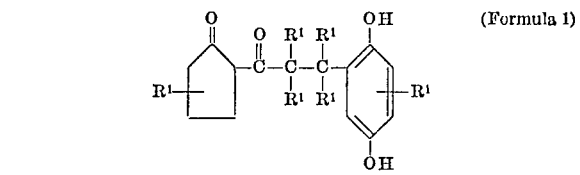

(Formula 1)

wherein, $R^1$ is a substituent which will not impair the functionality of the compound as a silver halide developing agent; each substituent can be the same or different and can be, for example, hydrogen, an alkyl radical—preferably lower alkyl, e.g., 1–6 carbon atoms—or an alkoxy radical—preferably lower alkoxy.

In accordance with the practice of the present invention, compounds of Formula 1 are prepared by way of the following representative sequence of reactions:

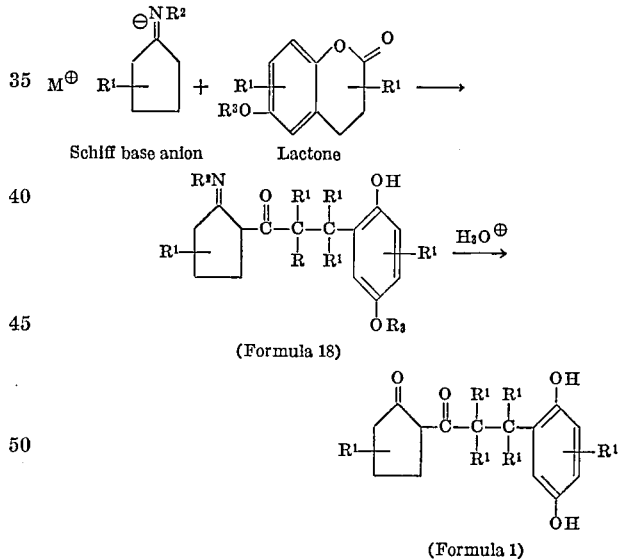

(Formula 18)

(Formula 1)

wherein, $R^1$ is as defined before, $NR^2$ represents an amino group that can be removed preferably under mild conditions to provide O, M represents a cation and $R^3$ represents hydrogen or an easily removable solubilizing protective group.

In accordance with the practice of the present invention the use of the specified Schiff base anion is considered critical in order to effect condensations with lactones of the type described, to provide attractive yields of the compound of Formula 1. For example, the direct acylation of the cyclopentanone anion with such lactones under conditions described in the literature was considered to be a proper initial approach to the problem. However, this approach provided low, commercially impractical yields of product, e.g., less than 15%.

Other procedures which those skilled in the art might expect to provide reasonable yields of the product of Formula 1 have not performed in accordance with such expectations. For example, condensation reactions involving the lactones with ethyl cyclopentan-2-onecarboxylate proceeded by way of O-acylation and provided only products of the following formula:

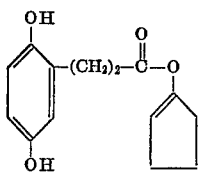

which would normally decompose to provide cyclopentanone and the aryl proprionic acid during an aqueous work-up. Also reactions of lactones with cyclopentanone enamines or with cyclopentanone via magnesium methyl carbonate resulted in no yields or only trace yields of the compound of Formula 1. Accordingly, the essence of the present invention resides in the discovery that the particular Schiff base anions can undergo acylation with the lactones defined to provide high yields of the product of Formula 1. This discovery is considered to be unexpected in view of the state of the art wherein Schiff base anions where known to be useful for acylation with esters or amides. (See Angew Chem. International edition, 7, No. 1, 8 (1963) by G. Wittig and H. Reiff and J. Am. Chem. Soc., 85, 2178, 1963 by G. Stork and S. Dowd.) However, no literature has been discovered describing the acylation of the Schiff base anions with the much less reactive lactones.

DETAILED DESCRIPTION OF THE INVENTION

The Schiff base anions involved in the above reaction sequence are prepared by deprotonating a Schiff base of the formula

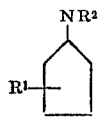

wherein $NR^2$ and $R^1$ are as defined before. Schiff bases of the formula

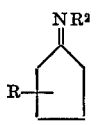

can be prepared in accordance with manners known to the art. A typical preparation is as follows:

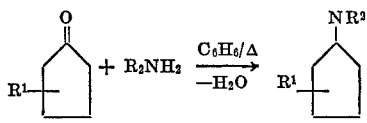

wherein $R^1$ is as defined before and $R^2$ can be for example, an alkyl, cycloalkyl, alkaryl or an aryl group. The following illustrates a suitable representative preparation of a Schiff base involved in a preferred embodiment of the present invention:

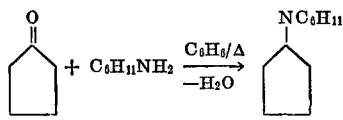

The particular reagent involved in "deprotonating" the Schiff base to provide the Schiff base anion is an important consideration in assuring a high degree of efficiency in the practice of the present process. Deprotonating reagents are known and they include Grignard reagents and metal amides of a secondary amine. In the preferred practice of the present invention metal amides of such secondary amines as dimethylamine, diethylamine and particularly the more hindered diisopropylamine are especially suitable. Accordingly suitable deprotonating reagents include lithium diisopropylamide, bromomagnesium diisopropylamide or ethylmagnesium bromide among others. The lithium diisopropylamide is especially preferred since it reacts faster and can produce good yields of deprotonated Schiff base anion products at or below room temperature. Bromo- or chloromagnesium diisopropylamide require a short period of heating for the Schiff base anion formation but they may have a slight economic advantage over the lithium derivative. All these diisopropylamides can be formed in situ from diisopropylamine and either n-butyllithium or a Grignard reagent, such as ethylmagnesium chloride or bromide. The following reactions illustrate representative methods for producing Schiff base anions.

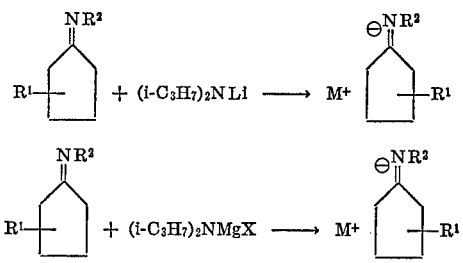

where, for example, M is Li, or MgX, and X is Cl or Br. An especially suitable solvent for the above reactions is tetrahydrofuran. The preferred preparation for Schiff base anions involves the use of about equivalent amounts of deprotonating reagent to each mole of Schiff base with one additional equivalent of the base added to effect the condensation.

A direct formation of a Schiff base anion with a Grignard reagent, such as ethylmagnesium bromide, without prior formation of a diisopropylamide, can also be used, but is considered to be less efficient, because some direct addition of the reagent to the C=N can also occur.

In the process of the present invention the Schiff base anion is reacted with a lactone conforming to the following formula:

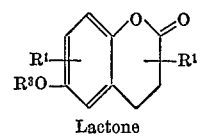

Lactone wherein $R^1$ is as defined before and $R^3$ can be hydrogen or represents a solubilizing protective group which can be removed to provide the hydroxy group at this position. Especially preferred solubilizing groups are the tetrahydropyranyl radical,

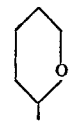

or alkoxy methyl radicals, e.g., the methoxymethyl radical, $CH_3OCH_2—$. In the especially preferred practice of the present invention above two mole equivalents of Schiff base anion are reacted with about one mole equivalent of lactone.

The reaction parameters involved in the condensation of the Schiff base anion and the lactones are not considered especially critical but those providing high yields will be apparent from the present disclosure. The solubility of the reactants in most solvents is somewhat low; but substantially equivalent yields were obtained when the reaction was carried out for about one hour under reflux using such solvents as tetrahydrofuran, dioxane or 1,2-dimethoxyethane. The time and temperature of the reaction are not considered critical since the condensation reaction can be conducted at low temperatures, e.g., −60° C., room temperature or at reflux temperatures and the time can vary from one-half hour or less to 15 hours or more. Maximum yields, however, are usually obtained by refluxing the reactants for about one to about six hours.

In the above described reaction the condensation product conforms to the following formula or to tautomeric and isomeric forms thereof,

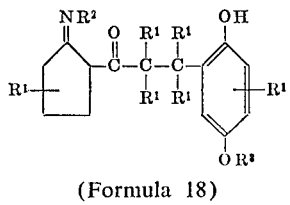

(Formula 18)

wherein $R^1$ and $R^2$ and $R^3$ are as defined before. Hydrolysis of the condensation product of the above formula removes the $NR^2$ group and simultaneously, or prior to that, removes the solubilizing protective groups, e.g., $R^3$ if present to provide the product of Formula 1. This hydrolysis can be performed with various organic acids, such as acetic, formic acid, or inorganic acids such as hydrochloric or sulfuric acid. An especially preferred hydrolysis medium is a mixture of water, tetrahydrofuran and an organic acid such as formic acid.

The invention as well as manners of practicing same will be more fully appreciated by reference to the following illustrative examples which relate to the preferred embodiments.

THE PREFERRED EMBODIMENTS OF THE INVENTION

EXAMPLE 1

The following example illustrates a method for preparing the lactone 6-hydroxy-3,4-dihydrocoumarin tetrahydropyranyl ether which is an especially preferred intermediate in the practice of the present invention.

Into a suspension of 1.64 g. (0.01 mole) of 6-hydroxy-3,4-dihydrocoumarin in 20 ml. of methylene chloride (previously stored over 4A Linde Molecular Sieve) and 100 mg. of p-toluene sulfonic acid, protected from moisture, and cooled externally in an ice bath, 1.5 ml. (0.0165 mole) of dihydropyran (distilled and stored over 4A molecular sieve) was added dropwise with vigorous stirring over a period of 10 min., by which time the mixture became homogeneous. After stirring of an additional 30 min. at ice bath temperature, 0.1 ml. of triethylamine was added and stirring was continued for ten minutes. Solvent was removed first on the rotary evaporator and then on the vacuum pump when 3.2 g. of a viscous oil was obtained.

EXAMPLE 2

The following example illustrates the preparation of N-cyclopentylidinecyclohexamine which is a preferred Schiff base in the practice of the present invention.

A solution of 47 g. (0.5 mole) of cyclopentanone and 50.5 g. (0.51 mole) of cyclohexylamine in 100 ml. of dry benzene was heated under reflux for 24 hr. using a Dean-Stark water separator. Benzene was removed on the rotary evaporator and the fractional distillation of the residual oil grave 76.6 g. (93% theroy) of the Schiff base B.P. 54–55°/0.005 mm.

EXAMPLE 3

The following example illustrates the condensation of the tetrahydropyranyl ether of 6-hydroxy-3,4-dihydrocoumarin of Example 1 with the N-cyclopentyl-idenecyclohexamine of Example 2 in the presence of chloromagnesium diisopropylamide, formed in situ from diisopropylamine and ethylmagnesium chloride.

The reaction was carried under nitrogen atmosphere with exclusion of moisture.

To a solution of 4.35 ml. (0.03 mole) of diisopropylamine in 10 ml. of tetrahydrofuran (stored overnight over 4A molecular sieve) and 10 ml. (0.0296 mole) of ethylmagnesium chloride (2.96 molar in THF), 3.30 g. (0.02 mole) of N-cyclo-pentylidenecyclohexylamine was added, and the reaction mixture heated under reflux for 60 min. After cooling in an ice bath, a solution of 3.2 g. (0.01 mole) of the crude tetrahydro pyranyl ether of 6-hydroxy-3,4-dihydrocoumarin in 30 ml. of tetrahydrofuran was added dropwise over 30 min. with stirring, and the reaction mixture was refluxed for 3 hr. After cooling in an ice bath, the pH of the resulting deep orange colored solution was adjusted between 5 and 6 using 1 N hydrochloric acid. The reaction mixture was extracted with three 50-ml. portions of ethyl acetate; the extracts were washed with saturated sodium chloride solution and dried over anhydrous sodium sulfate. Removal of solvent, first on the rotary evaporator and then on the vacuum pump, gave 5.01 g. of an amorphous residue, which collapsed to a syrup on storage;

331 m$\mu$ ($\epsilon$=14,600), indicated a 65.25% purity, corresponding to an overall yield of 79.10% of theory based on a 6-hydroxy-3,4-dihydrocoumarin. Chromatographic purification of crude Schiff base on florisil using first chloroform and subsequently 10% ether in chloroform as the eluting solvents followed by crystallization from ethyl formate-hexane mixture gave an analytically pure sample, M.P. 132–34°

331 m$\mu$ ($\epsilon$=22,400) of the condensation product conforming to a formula

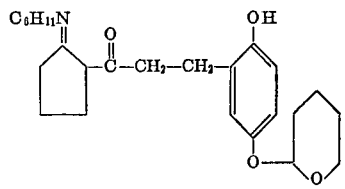

*Analysis.*—Calcd. for $C_{25}H_{35}O_4N$ (percent): C, 72.60; H, 8.53; N, 3.39. Found (percent): C, 72.95; H, 8.59; N, 3.32.

EXAMPLE 4

The following example illustrates the condensation of the tetrahydropyranyl ether of 6-hydroxy 3,4-dihydrocoumarin of Example 1 with the N-cyclopentylidenecyclohexyamine of Example 2 in the presence of lithium diisopropylamide, formed in situ from diisopropylamine and n-butyllithium.

The reaction was carried under a nitrogen atmosphere with exclusion of moisture.

To a solution of 4 ml. (0.028 mole) of diisopropylamine in 10 ml. of tetrahydrofuran (stored overnight over 4A molecular sieve), cooled to −40°, 9 ml. (0.02 mole) of a 2.22 molar solution of n-butyl lithium in n-hexane was added with stirring. The cooling bath was removed and the reaction mixture was allowed to warm up to room temperature over a period of 10 min. A solution of 1.65 g. (0.01 mole) of N-cyclopentylidinecyclohexylamine in 5 ml. of tetrahydrofuran was then added dropwise, over a 5 min. period. Stirring was continued for 15 min., and a solution of 3.2 g. (0.01 mole) of the crude tetrahydropyranyl ether of 6-hydroxy-3,4-dihydrocoumarin in 25 ml. of tetrahydrofuran was added dropwise over a period of 15 mins. The homogeneous solution was heated under reflux for 6 hrs. After cooling in an ice bath a solution of 50 ml. of 10% aqueous ammonium chloride was added and the pH of the resulting solution adjusted between 5 and 6 using 1 N hydrochloric acid. The reaction mixture was extracted with three 100 ml. portions of ethyl acetate, the extracts were washed with saturated sodium chloride solution and dried over anhydrous sodium sulfate. Removal of solvent, first on the rotary evaporator and then on the vacuum pump, gave 4.52 g. of an amorphous residue, which collapsed to a syrup on storage;

331 mμ (ε=10,625); 290 (ε=3,945) indicated at 45.4% purity, corresponding to an overall yield of 62.0% of theory based on 6-hydroxy-3,4-dihydrocoumarin.

EXAMPLE 5

The following example illustrates a hydrolysis of the condensation products of Examples 3 and 4 to provide the compound of the Formula 16.

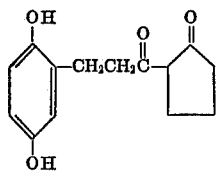

A solution of 4.84 g. of the crude Schiff base, as obtained in Examples 3 and 4, $$\lambda_{max.}^{C_2H_5OH} \; 331 \; m\mu$$

(ε=14,600) in 50 ml. of tetrahydrofuran, 5 ml. of formic acid (98–100%) and 20 ml. of water was heated on a steam bath for three hours. Reaction mixture was adjusted to pH 6.5 with aqueous sodium bicarbonate and extracted with three 50-ml. portions of ethyl acetate. The extracts were washed with saturated sodium chloride solution and dried over anhydrous sodium sulfate. Removal of solvent, first on the rotary evaporator and then on the vacuum pump, gave 3.77 g. of an oily residue which analyzed by VPC (OV–101 at 260°) for 36.2% of the compound of Formula 17 which corresponds to 72% yield. Overall content yield of the compound of Formula 16 from the two steps (condensation and hydrolysis) based on 6-hydroxy-3,4-dihydrocoumarin is thus 56.7%.

EXAMPLE 6

The following procedure involves the combination of the condensation step with an in situ hydrolysis of the condensation product.

The reaction was carried under nitrogen atmosphere with exclusion of moisture using ethylmagnesium bromide.

To a solution of 3 ml. (0.0208 mole) of diisopropylamine in 10 ml. of tetrahydrofuran (stored overnight over 4A molecular sieve) and 7 ml. (0.021 mole) of a 3 molar solution of ethylmagnesium bromide in ether, 1.65 g. (0.01 mole) of N-cyclopentylidenecyclohexylamine was added, and the reaction mixture heated under reflux for 15 min. After cooling in ice bath, a solution of 3.2 g. (0.01 mole) of the crude tetrahydropyranyl ether of 6-hydroxy-3,4-dihydrocoumarin in 30 ml. of tetrahydrofuran was added dropwise over 30 min. with stirring, and the reaction was refluxed for 3 hr. After cooling in ice bath, a solution of 8 ml. of formic acid (98–100%) in 25 ml. of water was added, and the resulting solution was heated under reflux with stirring for 3 hrs. The reaction mixture was cooled in ice bath, the pH of ice solution was adjusted between 6 and 7 using 40 ml. of water and 10–11 g. of solid sodium bicarbonate, and the solution extracted with three 50-ml. portions of ethyl acetate. The combined extracts were washed with saturated sodium chloride solution and dried over anhydrous sodium sulfate. Removal of solvent, first on the rotary evaporator and then on the vacuum pump, gave 3.28 g. of an oily residue which analyzed by VPC (OV–101 at 260°) for 39.1% of the compound of Formula 16 which corresponds to 51.7% overall content yield of the compound of Formula 16 based on 6-hydroxy-3,4-dihydrocoumarin. The above experiment, if carried out in two separate steps would give an overall content yield of 52.5%.

EXAMPLE 7

The following example illustrates a condensation of the 6-hydroxy-3,4-dihydrocoumarin and the N-cyclopentylidenecyclohexamine of Example 2 in the presence of the deprotonating reagent lithium diisopropylamide formed in situ from n-butyllithium and diisopropylamine.

The reaction was carried under a nitrogen atmosphere with exclusion of moisture.

To a solution of 4 ml. (0.028 mole) of diisopropylamine in 10 ml. of tetrahydrofuran (stored overnight over 4A molecular sieve), cooled to −40°, 9 ml. (0.02 mole) of a 2.22 molar solution of n-butyllithium in n-hexane was added with stirring. The cooling bath was removed and the reaction mixture was allowed to warm up to room temperature over a period of 10 min. A solution of 1.65 g. (0.01 mole) of N-cyclophenylidenecyclohexylamine in 5 ml. of tetrahydrofuran was then added dropwise, over a 5 min. period. Stirring was continued for 15 min., and a solution of 1.64 g. (0.01 mole) of 6-hydroxy-3,4-dihydrocoumarin in 70 ml. of tetrahydrofuran was added dropwise with constant stirring over 15 min. The reaction mixture which had now become heterogeneous, was stirred for 3 hr. at room temperature. A solution of 50 ml. of 10% aqueous ammonium chloride was added and the pH of the solution adjusted between 5 and 6 using 1 N hydrochloric acid. The reaction mixture was extracted with three 100 ml. portions of ethyl acetate, the extracts were washed with saturated sodium chloride solution and dried over anhydrous sodium sulfate. Removal of solvent, first on the rotary evaporator and then on the vacuum pump, gave a solid (2.6 g., 79% theory)

$$\lambda_{max.}^{C_2H_5OH}$$

331 mμ (ε=16,100).

The solid was triturated with ether, filtered, and crystallized from an ethyl acetate-hexane mixture, yielding 1.87 g. (57% overall yield) of an analytically pure sample M.P. 163–165°;

$$\lambda_{max.}^{C_2H_5OH}$$

331 mμ (ε=22,400) of condensation product conforming to formula

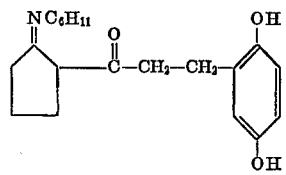

*Analysis.*—Calcd. for $C_{20}H_{27}O_3N$ (percent): C, 72.92; H, 8.26; N, 4.25. Found (percent): C, 73.09; H, 8.39; N, 4.18.

EXAMPLE 8

The following example illustrates two methods for removing the $NC_6H_{11}$ group of the product of Example 7 to provide a compound of the Formula 16.

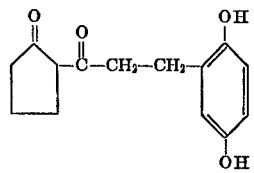

(1) A solution of 330 mg. (0.001 mole) of the product of Example 7 in 5 ml. of dioxane and 1.5 ml. of 1 N hydrochloric acid was heated under reflux on steam bath for 70 min. The solution was diluted with 15 ml. of water and extracted with 15 ml. portions of ethyl acetate. The extract was washed with water and saturated sodium chloride solution and was dried over anhydrous sodium sulfate. Removal of solvent, first on the rotary evaporator, and then on the vacuum pump, gave 300 mg. of an oily residue which analyzed by VPC (QV–101 at 260°) for 56% of the compound of Formula 16 which corresponds to an overall yield of 67.5%.

(2) A solution of 3.649 g. of the Product of Example 7

$$(\lambda_{max.}^{C_2H_5OH} \ 331 \ m\mu)$$

($\epsilon$=14,900) in 50.0 ml. of tetrahydrofuran, 5 ml. of formic acid (98–100%) and 20 ml. of water was heated on a steam bath for three hours. The reaction mixture was adjusted to pH 6.5 with aqueous sodium bicarbonate and extracted with three 50-ml. portions of ethyl acetate. The extracts were washed with saturated sodium chloride solution and dried over anhydrous sodium sulfate. Removal of solvent, first on the rotary evaporator and then on the vacuum pump, gave 2.83 g. of an oily residue which analyzed by VPC (OV–101 at 260°) for 54.2% of the compound of Formula 16 which coresuponds to 84% yield. Overall content yield from the two steps (condensation and hydrolysis) is thus 63.5%.

EXAMPLE 9

The following example illustrates a preferred method for treating the products of the process of the present invention to provide compounds of Formula 16 of high purity.

A product of the condensation and hydrolysis reaction of the present process (3.726 g. containing 37% of the compound of Formula 16) was dissolved in 50 ml. of ethyl acetate and the solution filtered to remove the suspended impurities. The filtrate was extracted with 100 ml. of 4% aqueous sodium bicarbonate to remove any acidic impurities. The organic phase was deoxygenated by bubbling in nitrogen for 10 min. and then extracted with three 20-ml. portions of deoxygenated 0.25 N solution of sodium hydroxide. The organic phase gave a negative ferric chloride color test indicating the absence of deblocked ligand. The combined aqueous extracts after acidification to pH 5–6 with 1 N hydrochloric acid were extracted with three 30-ml. portions of ethyl acetate. The combined extracts were washed with saturated sodium chloride solution and dried over anhydrous sodium sulfate. Removal of solvent, first on the rotary evaporator, and then on the vacuum pump at 50° for 15 min., gave 1.61 g. of a thick residue which by VPC (OV–101 at 260°) analyzed for 73.2% content of the compound of Formula 16, thus giving 97% yield.

The product as obtained above was dissolved in a mixture of 50 ml. of ethyl acetate and 20 ml. of isooctane. A hot solution of 0.75 g. (0.038 mole) of cupric acetate monohydrate in 20 ml. of water was added and the mixture stirred vigorously for 20 min. The precipitated copper salt was filtered, washed successively with 20 ml. of methylene chloride and with 30 ml. of 2.5% solution of isopropanol in methylene chloride, and dried in vacuum at 50° C. for one hour. The dried salt (1.327 g.) absorbed at $$\lambda_{max.}^{MeCell}$$

312 m$\mu$, $\epsilon$=27,000, indicating a 93.2% purity, which corresponds to a 97% yield (authentic sample of the copper salt absorbs at $$\lambda_{max.}^{MeCell}$$

312 m$\mu$, $\epsilon$=29,000).

A suspension of 1.0 g. of the above copper salt in 20 ml. of ethyl acetate was stirred with 10 ml. of 1 N sulfuric acid for 15 min. The organic phase was separated and the aqueous phase extracted with 15 ml. of ethyl acetate. The combined extracts were washed with saturated sodium chloride solution and dried over anhydrous sodium sulfate. Removal of solvent, first on the rotary evaporator and then on the vacuum pump at 50° for 30 min., gave 0.895 g. of a solid which analyzed by VPC (OV–101 at 260°) for 93.8% content of the compound of Formula 16.

Since certain changes can be made in many of the features of the above description and disclosure without departing from the spirit and scope of the invention defined in the appended claims, it is intended that all matter contained in the above description shall be interpreted as illustrative and not in a limiting manner.

What is claimed is:

1. A process which comprises the steps of (a) reacting a Schiff base anion of the formula:

[structure: cyclic Schiff base anion with =NR², M⊕, ⊖, R¹]

with a lactone of the formula:

[structure: bicyclic lactone with R¹, R¹, R³O substituents]

to provide a compound of the formula:

[structure: NR²...C(=O)-C(R¹)(R¹)-C(R¹)(R¹)-aryl with OH and OR³ substituents, R¹ groups]

and, (b) hydrolyzing the reaction product of Step (a) to provide a silver halide developing agent of the formula

[structure: ketone-C(=O)-C(R¹)(R¹)-C(R¹)(R¹)-aryl with OH and OH substituents, R¹ groups]

wherein, R¹ is a substituent selected from the group consisting of hydrogen, an alkyl radical or an alkoxy radical; R² is selected from the group consisting of an alkyl radical, a cyclo alkyl radical, an alkaryl radical or an aryl radical; R³ is selected from the group consisting of hydrogen, an alkoxymethyl radical or a tetrahydropyranyl radical and M is selected from the group consisting of lithium or a magnesium halide.

2. A process of claim 1 wherein said Schiff base anion conforms to the formula

[structure: cyclohexanone Schiff base anion with ⊖NR², M⊕, R¹]

and R¹ is hydrogen, R² is cyclohexyl and M is Li or MgX where X is chlorine or bromine.

3. A process of claim 2 wherein M is Li.

4. A process of claim 2 wherein M is MgX.

5. A process of claim 1 wherein said lactone conforms to the formula:

[structure: bicyclic lactone with R¹, R¹, R³O substituents]

wherein R¹ is hydrogen and R³ is hydrogen,

[structure: tetrahydropyranyl ether]

or CH₃OCH₂—.

6. A process of claim 5 wherein R³ is hydrogen.

7. A process of claim 5 wherein $R^3$ is

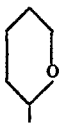

8. A process of claim 5 wherein $R^3$ is $CH_3OCH_2$—.

9. A process which comprises the steps of (a) reacting a Schiff base anion of the formula

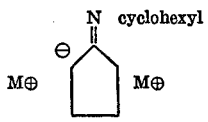

where M is Li, MgCl or MgBr with a lactone of the formula

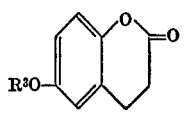

wherein $R^3$ is hydrogen,

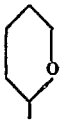

or $CH_3OCH_2$— to provide a compound of the formula

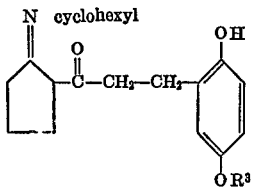

(b) hydrolyzing the product of Step (a) to provide a compound of the formula

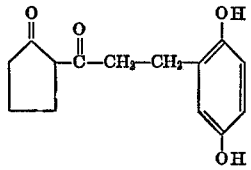

10. A process of claim 9 wherein M is Li.
11. A process of claim 9 wherein M is MgCl or MgBr.

References Cited
UNITED STATES PATENTS
3,551,406  12/1970  Idelson _____ 260—590
3,629,336  12/1971  Idelson _____ 260—590

DANIEL D. HORWITZ, Primary Examiner

U.S. Cl. X.R.

260—343.5, 566 R